US008718155B2

(12) United States Patent
Kim et al.

(10) Patent No.: US 8,718,155 B2
(45) Date of Patent: May 6, 2014

(54) PILOT DESIGN METHOD, RECORDING MEDIUM, AND TRANSMISSION APPARATUS

(75) Inventors: Ji Hyung Kim, Daejeon (KR); Young Seog Song, Daejeon (KR); Dong Seung Kwon, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 288 days.

(21) Appl. No.: 12/734,354

(22) PCT Filed: Jul. 8, 2008

(86) PCT No.: PCT/KR2008/004018
§ 371 (c)(1),
(2), (4) Date: Apr. 26, 2010

(87) PCT Pub. No.: WO2009/054598
PCT Pub. Date: Apr. 30, 2009

(65) Prior Publication Data
US 2010/0254468 A1    Oct. 7, 2010

(30) Foreign Application Priority Data

Oct. 26, 2007 (KR) .................. 10-2007-0108305

(51) Int. Cl.
*H04L 27/28* (2006.01)
(52) U.S. Cl.
USPC .......................................... 375/260
(58) Field of Classification Search
CPC ............................. H04L 5/0007; H04L 5/0048
USPC .......................................... 375/260
See application file for complete search history.

(56) References Cited

U.S. PATENT DOCUMENTS 7,564,829 B2 *  7/2009  Jin et al. ................ 370/343
7,924,935 B2 *  4/2011  Tong et al. .............. 375/267
(Continued)

FOREIGN PATENT DOCUMENTS

JP       2003304215 A    10/2003
WO    WO 2006/071050 A1   7/2006
(Continued)

OTHER PUBLICATIONS

International Search Report and Written Opinion of the International Searching Authority dated Dec. 29, 2008 in connection with PCT Patent Application No. PCT/KR2008/004018.

(Continued)

*Primary Examiner* — Juan A Torres

(57) ABSTRACT

In an orthogonal frequency division multiple access (OFDMA) communication system, a transmission apparatus connects multiple tiles, which have a 4×3 structure, along a time or frequency axis in an uplink 4-layer partial usage of subchannels (PUSC) mode, and designs pilots corresponding to one layer at one of multiple symbol positions adjacent to a first corner of the tiles and one of multiple symbol positions adjacent to a second corner of the tiles that face the first corner in a diagonal direction. In this case, null symbols are designed at the rest of the symbol positions adjacent to the first corner or the second corner where the pilots are not designed. Accordingly, a receiving apparatus can obtain n channel values from n tiles. Further, n estimated channel values are applied to a linear interpolation method, so that it is possible to estimate the entire channel value of n tiles.

20 Claims, 5 Drawing Sheets

(56) References Cited

U.S. PATENT DOCUMENTS

| | | | |
|---|---|---|---|
| 8,077,596 B2* | 12/2011 | Naguib et al. | 370/208 |
| 8,139,683 B2* | 3/2012 | Eldar et al. | 375/316 |
| 2005/0286408 A1* | 12/2005 | Jin et al. | 370/208 |
| 2006/0120470 A1* | 6/2006 | Hwang et al. | 375/260 |
| 2006/0171295 A1* | 8/2006 | Ihm et al. | 370/208 |
| 2007/0014254 A1 | 1/2007 | Chung et al. | |
| 2007/0025460 A1* | 2/2007 | Budianu et al. | 375/260 |
| 2007/0032199 A1* | 2/2007 | Chang et al. | 455/69 |
| 2007/0177684 A1 | 8/2007 | Halbauer et al. | |
| 2008/0031309 A1* | 2/2008 | Chang et al. | 375/147 |
| 2008/0095223 A1* | 4/2008 | Tong et al. | 375/228 |
| 2008/0108310 A1* | 5/2008 | Tong et al. | 455/69 |
| 2008/0151985 A1* | 6/2008 | Chin et al. | 375/231 |
| 2008/0152052 A1* | 6/2008 | Thomas | 375/346 |
| 2008/0165891 A1* | 7/2008 | Budianu et al. | 375/299 |
| 2008/0225792 A1* | 9/2008 | Naguib et al. | 370/330 |
| 2008/0273510 A1* | 11/2008 | Mudulodu et al. | 370/339 |
| 2009/0046772 A1* | 2/2009 | Yu et al. | 375/229 |
| 2009/0252079 A1* | 10/2009 | Zhang et al. | 370/315 |
| 2009/0303918 A1* | 12/2009 | Ma et al. | 370/315 |
| 2010/0008216 A1* | 1/2010 | Li et al. | 370/208 |

FOREIGN PATENT DOCUMENTS

| | | |
|---|---|---|
| WO | WO 2006/134949 A1 | 12/2006 |
| WO | WO 2007/098450 A2 | 8/2007 |
| WO | WO 2007/102493 A1 | 9/2007 |

OTHER PUBLICATIONS

P802.16rEV2/d0B, IEEE 802.16, Draft Standard for Local and Metropolitan Area Networks, "Part 16: Air Interface for Broadband Wireless Access Systems", (Jun. 27, 2007), pp. 1-1714.

Yaniv, et al.; "Corrections to definitions of Uplink MIMO in OFDMA PHY"; IEEE 802.16 Broadband Wireless Access Working Group <http://ieee802.org/16>, Nov. 13, 2004, 5 pages.

Ma, et al.; "CQICH Based UL Channel Sounding"; IEEE 802.16 Broadband Wireless Access Working Group <http://ieee802.org/16>, Nov. 4, 2004, 6 pages.

Sofer, et al.; "Deployment Scenarios with reuse 1 (utilizing FUSC and PUSC concept)"; IEEE P802.22 Wireless RANs; Runcom, Jul. 2006, 16 pages.

Tee, et al.; "Partial proposal on channel multiplexing—Presentation"; IEEE 802.20 Working Group on Mobile Broadband Wireless Access <http://grouper.ieee.org/groups/802/20/>, Mar. 13, 2007, 22 pages.

Nortel, "UL OFDMA Performance with Real Channel Estimation", 3GPP R1-051240, Oct. 10-14, 2005, San Diego, CA, 15 pages.

Itri, "Simultaneous Transmit Diversity and Spatial Multiplexing for EUTRA Uplink Multiuser MIMO", 3GPP R1-063454, Nov. 6-10, 2006, Riga, Latvia, 4 pages.

Office Action dated Apr. 23, 2013 in connection with Japanese Application No. 2010-530919, 6 pages.

\* cited by examiner

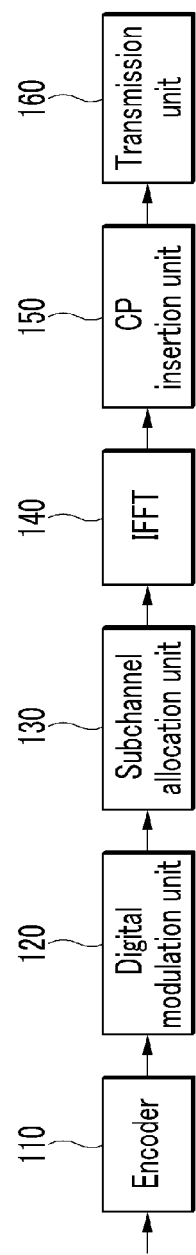

Fig. 2]
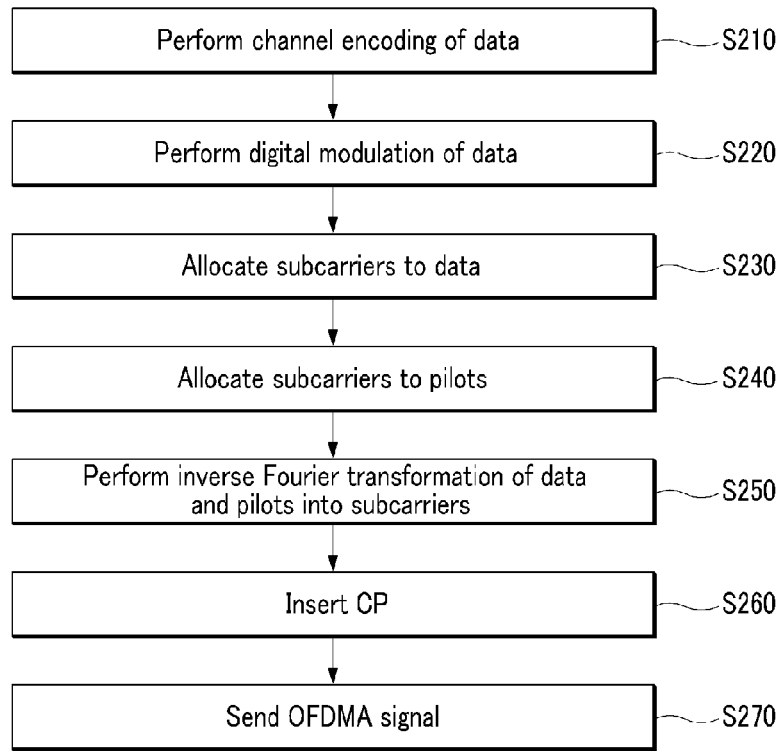
Fig. 3
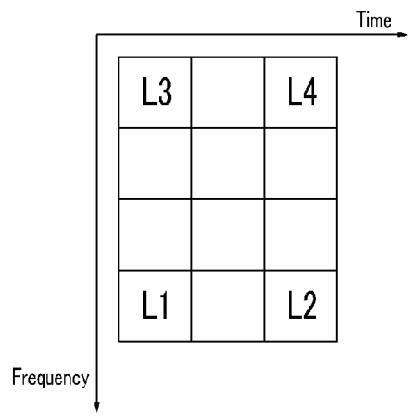
Fig. 4
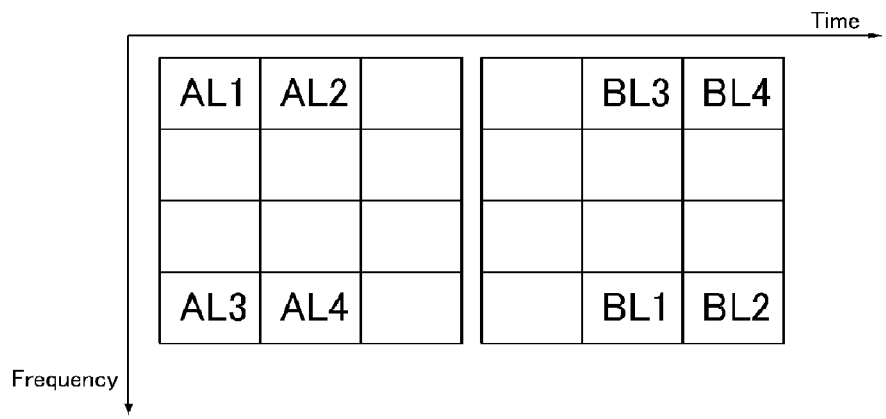

PILOT DESIGN METHOD, RECORDING MEDIUM, AND TRANSMISSION APPARATUS

CROSS-REFERENCE TO RELATED APPLICATION(S)

The present application is related to International Application No. PCT/KR2008/004018 filed Jul. 8, 2008 entitled "PILOT DESIGN METHOD, RECORDING MEDIUM, AND TRANSMISSION APPARATUS" which claims priority to Korean Patent Application No. 10-2007-0108305 filed Oct. 26, 2007. International Application No. PCT/KR2008/004018 is assigned to the assignee of the present application and is hereby incorporated by reference into the present disclosure as if fully set forth herein. The present application hereby claims priority under 35 U.S.C. §119(a) to International Patent Application No. PCT/KR2008/004018 and Korean Patent Application No. 10-2007-0108305.

TECHNICAL FIELD

The present invention relates to a pilot design method, a recording medium, and a transmission apparatus. More particularly, the present invention relates to a pilot design method, a recording medium, and a transmission apparatus that design pilots in an uplink 4-layer partial usage of subchannels (PUSC) mode in an orthogonal frequency division multiple access (OFDMA) system.

BACKGROUND ART

An orthogonal frequency division multiplexing (hereinafter referred to as "OFDM") method is a communication method that divides high-speed serial data into low-speed parallel signals, modulates the parallel signals into orthogonal subcarriers, and transmits the subcarriers.

Further, an orthogonal frequency-division multiple access (referred to as "OFDMA" or "OFDM-FDMA") method is one of multiple access methods. The OFDMA method allocates a part of a resource to each of a plurality of layers in a two-dimensional map where a limited uplink/downlink radio resource is divided by a time axis and a frequency axis, and designs one layer at the corresponding part of the resource. In this case, the layer may be represented by the product of the number of users and the number of the transmission antennas when a plurality of users use a plurality of transmission antennas, respectively.

Meanwhile, channel estimation using a pilot may be used to compensate the distortion of the amplitude and phase of a symbol, which is caused by multipath attenuation of a radio channel. In this case, the pilot means a signal having structure or form, which is engaged between a transmitting terminal and a receiving terminal. The above-mentioned pilot is allocated to some subcarriers of a tile that are a basic unit of the radio resource allocation, and the receiving terminal can estimate the channel value of the corresponding channel by a pilot.

However, since a method of determining which channel the corresponding pilot corresponds to varies depending on a method of designing a pilot on a tile, transmission efficiency and channel estimation performance vary. For this reason, an efficient pilot design method is required.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a pilot design method, a recording medium, and a transmission apparatus that can improve channel estimation performance using an existing tile structure.

Technical Solution

A first exemplary embodiment of the present invention provides a pilot design method that designs pilots corresponding to a first layer of a plurality of layers to an uplink frame including a plurality of successive tiles. The pilot design method includes receiving pilot position information from a base station, designing a first pilot corresponding to one layer at one of a plurality of symbol positions adjacent to a first corner of the plurality of successive tiles according to the pilot position information, and designing a second pilot corresponding to one layer at one of a plurality of symbol positions adjacent to a second corner of the plurality of successive tiles according to the pilot position information. In this case, the first and second corners may be end points of a diagonal line of the plurality of successive tiles.

The designing of the first pilot may include designing null symbols at the rest of the plurality of symbol positions adjacent to the first corner, and the designing of the second pilot may include designing null symbols at the rest of the plurality of symbol positions adjacent to the second corner. In this case, the plurality of tiles may be positioned in succession along a time axis. Further, the plurality of tiles may be positioned in succession along a frequency axis.

Furthermore, the plurality of tiles may include a first tile, a second tile, a third tile, and a fourth tile. The first and second tiles may be positioned in succession along the time axis, and the third and fourth tiles may be positioned in succession along the time axis. Alternatively, the first and third tiles may be positioned in succession along the frequency axis, and the second and fourth tiles may be positioned in succession along the frequency axis. In this case, the pilot design method may further include designing a third pilot corresponding to one layer at one of a plurality of symbol positions adjacent to a third corner according to the pilot position information, and designing a pilot corresponding to one layer at one of a plurality of symbol positions adjacent to a fourth corner according to the pilot position information.

Each of the tiles may be divided into a plurality of subcarriers along the frequency axis and a plurality of symbol sections along the time axis.

A second exemplary embodiment of the present invention provides a recording medium that stores an uplink frame. The uplink frame may include a plurality of successive tiles. The plurality of successive tiles may include a first pilot that is designed at one of a plurality of symbol positions adjacent to a first corner of a plurality of successive tiles according to pilot position information of a base station, and a second pilot that is designed at one of a plurality of symbol positions adjacent to a second corner of the plurality of successive tiles according to the pilot position information of the base station. In this case, the first and second corners may be end points of a diagonal line of the plurality of successive tiles.

Null symbols may be designed at the rest of the plurality of symbol positions adjacent to the first corner, and null symbols may be designed at the rest of the plurality of symbol positions adjacent to the second corner.

A third exemplary embodiment of the present invention provides a recording medium that stores an uplink frame. The uplink frame may include a plurality of successive tiles. Pilots of first and second layers may be designed at a plurality of symbol positions adjacent to a first corner of the plurality of successive tiles. The pilots of the first and second layers may be designed at a plurality of symbol positions adjacent to a second corner of the plurality of successive tiles. In this case, the first and second corners are end points of a diagonal line of the plurality of successive tiles.

Further, pilots of third and fourth layers may be designed at a plurality of symbol positions adjacent to a third corner of the plurality of successive tiles, and the pilots of the third and fourth layers may be designed at a plurality of symbol positions adjacent to a fourth corner of the plurality of successive tiles. In this case, the third and fourth corners may be end points of a diagonal line of the plurality of successive tiles.

Furthermore, the plurality of tiles may be positioned in succession along a time axis or a frequency axis.

In addition, the plurality of tiles may include a first tile, a second tile, a third tile, and a fourth tile. The first and second tiles may be positioned in succession along the time axis, and the third and fourth tiles may be positioned in succession along the time axis. The first and third tiles may be positioned in succession along the frequency axis, and the second and fourth tiles may be positioned in succession along the frequency axis. Pilots of the third and fourth layers may be designed at the plurality of symbol positions adjacent to the first corner, and pilots of the third and fourth layers may be designed at the plurality of symbol positions adjacent to the second corner. In this case, the pilots of the first and second layers may be designed at the plurality of symbol positions adjacent to the third corner, and the pilots of the first and second layers may be designed at the plurality of symbol positions adjacent to the fourth corner.

A fourth exemplary embodiment of the present invention provides a transmission apparatus that transmits an uplink frame including a plurality of successive tiles. The transmission apparatus includes a subchannel allocation unit, an inverse fast Fourier transformation unit, a cyclic prefix insertion unit, and a transmission unit. The subchannel allocation unit designs a first pilot corresponding to one layer of a plurality of layers at one of a plurality of symbol positions adjacent to a first corner of the plurality of successive tiles, designs a second pilot corresponding to one layer at one of a plurality of symbol positions adjacent to a second corner of the plurality of successive tiles, and designs null symbols at the rest of the plurality of symbol positions adjacent to the first and second corners. The inverse fast Fourier transformation unit transforms the plurality of successive tiles into a plurality of symbols of a time domain. The cyclic prefix insertion unit inserts cyclic prefixes between the plurality of symbols. The transmission unit transmits an uplink frame that includes the cyclic prefixes and the plurality of symbols. In this case, the first and second corners may be end points of a diagonal line of the plurality of successive tiles. Further, the plurality of tiles may be positioned in succession along a time axis or a frequency axis.

Advantageous Effects

According to the present invention, while an existing tile structure is maintained, pilots can be designed on a plurality of successive tiles so as to be orthogonal using null symbols. Further, since a linear interpolation method can be applied, it is possible to estimate channel values of the entire channel. Therefore, it is possible to more accurately estimate channel values as compared to an existing pilot design method. As a result, it is possible to improve adaptability for coping with selective characteristics against the frequency and time of channels.

BRIEF DESCRIPTION OF THE DRAWINGS

FIG. 1 is a block diagram of an OFDMA transmission apparatus according to an exemplary embodiment of the present invention.

FIG. 2 is a flowchart illustrating an OFDMA transmission method according to an exemplary embodiment of the present invention.

FIG. 3 is a view showing a pilot design according to a first exemplary embodiment of the present invention.

FIG. 4 is a view showing a pilot design according to a second exemplary embodiment of the present invention.

MODE FOR THE INVENTION

Figure 5:
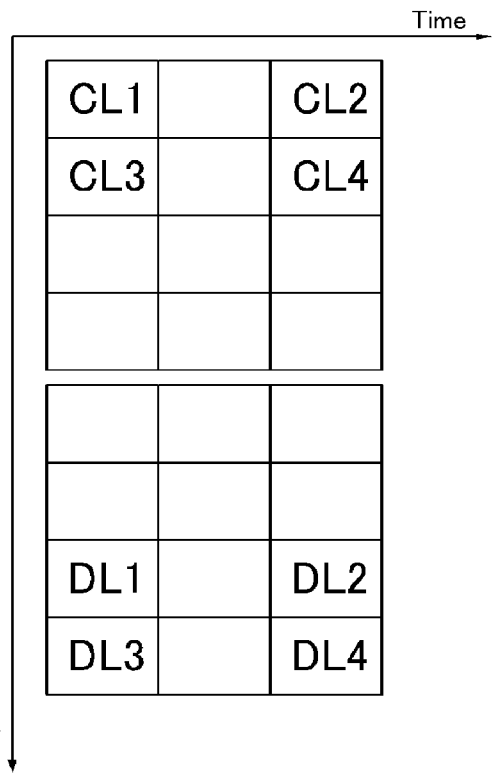
FIG. 5 is a view a pilot design according to a third exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. In addition, the terms "-er", "-or," and "module" described in the specification mean units for processing at least one function and operation and can be implemented by hardware components or software components and combinations thereof.

The present invention relates to a pilot design method, a recording medium, and a transmission apparatus in an uplink 4-layer partial usage of subchannels (PUSC) mode in an orthogonal frequency division multiple access (hereinafter referred to as "OFDMA") method. Here, when one user uses four transmission antennas, when each of two users uses two transmission antennas, or when each of four users uses one transmission antenna, four layers may be generated.

First, an OFDMA transmission method and apparatus according to exemplary embodiments of the present invention will be described.

FIG. 1 is a block diagram of an OFDMA transmission apparatus according to an exemplary embodiment of the present invention, and FIG. 2 is a flowchart illustrating an OFDMA transmission method according to an exemplary embodiment of the present invention.

As shown in FIG. 1, an OFDMA transmission apparatus includes an encoder 110, a digital modulation unit 120, a subchannel allocation unit 130, an inverse fast Fourier transformation (shown in FIG. 1 as "IFFT") unit 140, a cyclic prefix (CP) insertion unit (shown in FIG. 1 as "CP insertion unit") 150, and a transmission unit 160. Only a part of the OFDMA transmission apparatus, which transmits an OFDMA signal by one transmission antenna, is shown in FIG. 1. That is, only a block related to the transmission of data and pilots of any one layer is shown.

As shown FIG. 2, the encoder 110 encodes data at a corresponding code rate (S210).

The digital modulation unit 120 performs the digital modulation of the encoded data (S220).

The subchannel allocation unit 130 determines a subchannel through which digital-modulated data of a corresponding layer is transmitted. The subchannel includes a plurality of subcarriers per tile, and the subchannel allocation unit 130 determines subcarriers to be included in the subchannel of the corresponding layer. Here, the tile generally includes four subcarriers along a frequency axis and three symbol sections along a time axis, so that the tile has a 4×3 structure.

As shown in FIG. 2, the subchannel allocation unit 130 allocates subcarriers, which are used to transmit data, among a plurality of subcarriers included in the subchannel (S230). Further, the subchannel allocation unit 130 allocates a part of subcarriers of the tile, which are used to transmit pilots, among the plurality of subcarriers included in the subchannel (S240). A pilot design method that designs pilots on the tile will be described in detail below.

The IFFT unit 140 transforms data from signals of a frequency domain into signals of a time domain, and generates signals corresponding to a plurality of symbols (S250).

The cyclic prefix insertion unit 150 inserts cyclic prefixes (CP) of the time domain, which are used to maintain the orthogonality among the subcarriers, between the plurality of symbols that are output from the inverse fast Fourier transformation unit 140 (S260).

The transmission unit 160 sends OFDMA signals including the plurality of symbols to which the cyclic prefixes (CP) are inserted to the radio channel through the antennas (S270).

Next, a pilot design method, which designs pilots in an uplink 4-layer partial usage of subchannels (PUSC) mode by the subchannel allocation unit 130, will be described.

For simplification of description, a case where each of two users uses two transmission antennas will be exemplified below. That is, it is assumed that a first layer corresponds to a first user using a first transmission antenna, a second layer corresponds to a second user using a first transmission antenna, a third layer corresponds to a first user using a second transmission antenna, and a fourth layer corresponds to a second user using a second transmission antenna.

Further, a radio resource of the tile where one subcarrier and one symbol section cross each other is referred to as a symbol position. That is, since it has the 4×3 structure, the tile includes twelve symbol positions.

FIG. 3 is a view showing a pilot design according to a first exemplary embodiment of the present invention.

As shown in FIG. 3, according to the pilot design method of the first exemplary embodiment, pilots or null symbols may be designed at a symbol position L1, a symbol position L2, a symbol position L3, and a symbol position L4, that are positioned at corners of the tile having the 4×3 structure.

In this case, the pilots should be differently designed on each of the layers so that a receiving apparatus can distinguish layers of the pilots included in the tile.

For example, as shown in FIG. 3, pilots of signals corresponding to the first transmission antenna are designed at the symbol position L1 and the symbol position L4, and null symbols are designed at the symbol position L2 and the symbol position L3. In contrast, pilots of signals corresponding to the second transmission antenna are designed at the symbol position L2 and the symbol position L3, and null symbols are designed at the symbol position L1 and the symbol position L4. If the pilots corresponding to the first transmission antenna and the pilots corresponding to the second transmission antenna are designed to be orthogonal using the null symbols as described above, the pilots of both signals can be distinguished from each other even though the signals corresponding to the first transmission antenna and the signals corresponding to the second transmission antenna overlap each other in the receiving apparatus.

Further, among the signals corresponding to the first transmission antenna, the pilots of the signal corresponding to the first user are designed at the symbol position L1 and the symbol position L4, and the pilots of the signal corresponding to the second user are designed at the symbol position L1 and the symbol position L4. Furthermore, among the signals corresponding to the second transmission antenna, the pilots of the signal corresponding to the first user are designed at the symbol position L2 and the symbol position L3, and the pilots of the signal corresponding to the second user are designed at the symbol position L2 and the symbol position L3. That is, the pilots of the signals corresponding to the first and second users are designed on one tile so as to overlap each other.

For example, on first and second tiles that are signals corresponding to the first transmission antenna, the pilots of the signal corresponding to the first user, which have the same sign, are designed at each symbol position L1, and the pilots of the signal corresponding to the second user, which have opposite signs, are designed at each symbol position L4. The receiving apparatus perceives the pilots of the signal corresponding to the first user from the sum of the first and second tiles, and perceives the pilots of the signal corresponding to the second user from the difference between the first tile and the second tile.

As described above, in the pilot design method according to the first exemplary embodiment of the present invention, the pilots of four layers are distinguished by the overlapping pilot design and orthogonal design using the null symbols. Accordingly, while receiving only one tile, the receiving apparatus cannot perceive layers that correspond to two pilots included in the corresponding tile.

Second, third, and fourth exemplary embodiments of the present invention propose an orthogonal pilot design method that designs pilots of four layers on a plurality of successive tiles with null subcarriers.

FIG. 4 is a view showing a pilot design according to a second exemplary embodiment of the present invention.

According to a second exemplary embodiment of the present invention, pilots of four layers are designed on tiles (hereinafter referred to as a "4×6 structure") that are successively arranged along a time axis to form a 4×3 structure, so as to be orthogonal using null symbols.

As shown in FIG. 4, in the pilot design method according to the second exemplary embodiment, pilots or null symbols may be designed at a plurality of symbol positions (hereinafter referred to as a "first symbol position group") adjacent to four corners in the 4×6 structure. In this case, the plurality of symbol positions adjacent to each of the corners are positioned in succession along the time axis. That is, the first symbol position group includes a symbol position AL1, a symbol position AL2, a symbol position AL3, a symbol position AL4, a symbol position BL1, a symbol position BL2, a symbol position BL3, and a symbol position BL4 of a tile shown at the left portion of FIG. 4 (hereinafter referred to as an "A tile") and a tile shown at the right portion of FIG. 4 (hereinafter referred to as a "B tile"), Two pilots corresponding to the same layer are included in the A tile and the B tile of the first symbol position group, respectively. The two pilots are designed at two symbol positions facing each other in a diagonal direction, respectively, and null symbols are designed at the rest of the symbol positions of the first symbol position group where the pilots are not designed. Each of the four layers of the first symbol position group will be described below.

When the pilots corresponding to the signals of the first layer are designed at the first symbol position group, pilots are designed at the symbol position AL1 and the symbol position BL1 and null symbols are designed at the rest of the symbol positions of the first symbol position group except for the symbol position AL1 and the symbol position BL1.

When the pilots corresponding to the signals of the second layer are designed at the first symbol position group, pilots are designed at the symbol position AL2 and the symbol position BL2 and null symbols are designed at the rest of the symbol positions of the first symbol position group.

When the pilots corresponding to the signals of the third layer are designed at the first symbol position group, pilots are designed at the symbol position AL3 and the symbol position BL3 and null symbols are designed at the rest of the symbol positions of the first symbol position group.

When the pilots corresponding to the signals of the fourth layer are designed at the first symbol position group, pilots are designed at the symbol position AL4 and the symbol position BL4 and null symbols are designed at the rest of the symbol positions of the first symbol position group.

Next, a pilot design method according to a third exemplary embodiment of the present invention will be described.

FIG. 5 is a view showing a pilot design according to a third exemplary embodiment of the present invention.

According to a third exemplary embodiment of the present invention, pilots of four layers are designed on tiles (hereinafter referred to as "8×3 structure"), which are successively arranged along a frequency axis to form a 4×3 structure, so as to be orthogonal using null symbols.

As shown in FIG. 5, in the pilot design method according to the third exemplary embodiment, pilots or null symbols may be designed at a plurality of symbol positions (hereinafter referred to as a "second symbol position group") adjacent to four corners in the 8×3 structure. In this case, the plurality of symbol positions adjacent to each of the corners are positioned in succession along the frequency axis. That is, the second symbol position group includes a symbol position CL1, a symbol position CL2, a symbol position CL3, a symbol position CL4, a symbol position DL1, a symbol position DL2, a symbol position DL3, and a symbol position DL4 of a tile shown at the upper portion of FIG. 5 (hereinafter referred to as a "C tile") and a tile shown at the lower portion of FIG. 5 (hereinafter referred to as a "D tile").

According to the third exemplary embodiment, like the second exemplary embodiment, two pilots corresponding to the same layer are included in the C tile and the D tile of the second symbol position group, respectively. The two pilots are designed at two symbol positions facing each other in a diagonal direction, respectively, and null symbols are designed at the rest of the symbol positions of the second symbol position group where the pilots are not designed. Each of the four layers of the second symbol position group will be described below.

When the pilots corresponding to the signals of the first layer are designed at the second symbol position group, pilots are designed at the symbol position CL1 and the symbol position DL1 and null symbols are designed at the rest of the symbol positions of the second symbol position group except for the symbol position CL1 and the symbol position DL1.

When the pilots corresponding to the signals of the second layer are designed at the second symbol position group, pilots are designed at the symbol position CL2 and the symbol position DL2 and null symbols are designed at the rest of the symbol positions.

When the pilots corresponding to the signals of the third layer are designed at the second symbol position group, pilots are designed at the symbol position CL3 and the symbol position DL3 and null symbols are designed at the rest of the symbol positions.

When the pilots corresponding to the signals of the fourth layer are designed at the second symbol position group, pilots are designed at the symbol position CL4 and the symbol position DL4 and null symbols are designed at the rest of the symbol positions.

Next, a pilot design method according to a fourth exemplary embodiment of the present invention will be described.

Figure 6:
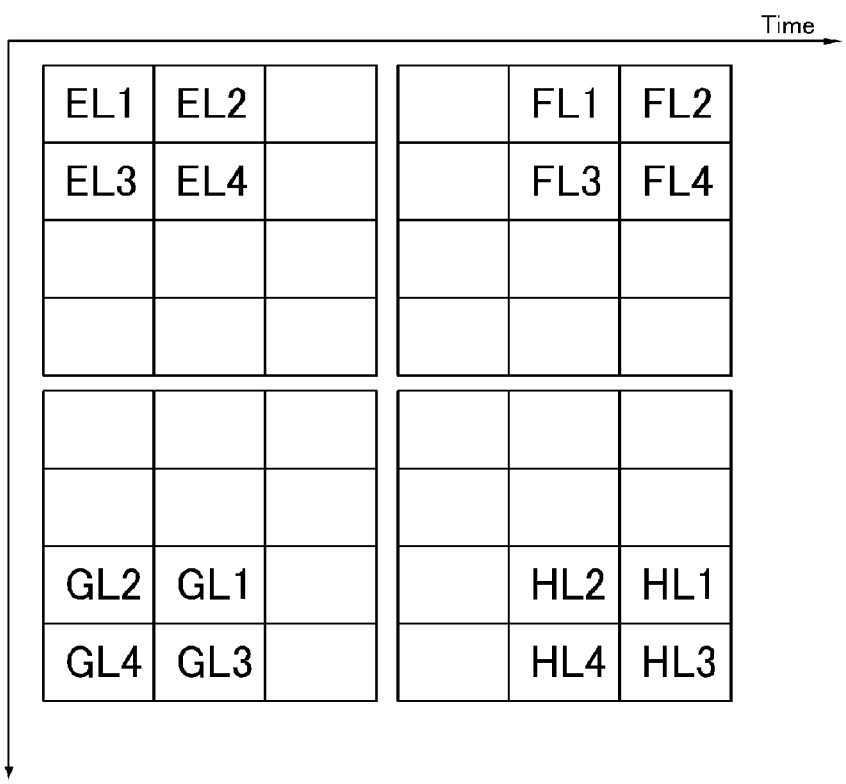
FIG. 6 is a view a pilot design according to a fourth exemplary embodiment of the present invention.

FIG. 6 is a view showing a pilot design according to a fourth exemplary embodiment of the present invention.

According to a fourth exemplary embodiment of the present invention, pilots of four layers are designed on tiles (hereinafter referred to as an "8×6 structure"), which are successively arranged along a time axis or a frequency axis to form 4×3 structure, so as to be orthogonal using null symbols. That is, the fourth exemplary embodiment provides a pilot design method that designs pilots of four layers on four tiles.

As shown in FIG. 6, in the pilot design method according to the fourth exemplary embodiment, pilots or null symbols may be designed at a plurality of symbol positions (hereinafter referred to as a "third symbol position group") adjacent to four corners in the 8×6 structure. In this case, the plurality of symbol positions adjacent to each of the corners are positioned in succession along the time axis or the frequency axis.

That is, as shown in FIG. 6, the third symbol position group includes four symbol positions, which are adjacent to each of corners of the 8×6 structure, of each of a tile shown at the left upper portion (hereinafter referred to as an "E tile"), a tile shown at the right upper portion (hereinafter referred to as a "F tile"), a tile shown at the left lower portion (hereinafter referred to as a "G tile"), and a tile shown at the right lower portion (hereinafter referred to as an "H tile"). Therefore, the third symbol position group includes sixteen symbol positions.

In more detail, the third symbol position group includes a symbol position EL1, a symbol position EL2, a symbol position EL3, and a symbol position EL4 that are adjacent to a left upper corner of the 8×6 structure and included in the E tile, and a symbol position FL1, a symbol position FL2, a symbol position FL3, and a symbol position FL4 that are adjacent to a right upper corner of the 8×6 structure and included in the F tile. The third symbol position group further includes a symbol position GL1, a symbol position GL2, a symbol position GL3, and a symbol position GL4 that are adjacent to a left lower corner of the 8×6 structure and included in the G tile, and a symbol position HL1, a symbol position HL2, a symbol position HL3, and a symbol position HL4 that are adjacent to a right lower corner of the 8×6 structure and included in the H tile.

Meanwhile, according to the fourth exemplary embodiment, four pilots corresponding to the same layer are designed at the four symbol positions included in each of the E tile, the F tile, the G tile, and the H tile of the third symbol position group. Further, null symbols are designed at the rest of the symbol positions of the third symbol position group, that is, other twelve symbol positions where the pilots are not designed. Each of the four layers of the third symbol position group will be described below.

When the pilots corresponding to the signals of the first layer are designed, pilots are designed at the symbol position EL1, the symbol position FL1, the symbol position GL1, and the symbol position HL1, and null symbols are designed at the rest of the symbol positions of the third symbol position group except for the symbol position EL1, the symbol position FL1, the symbol position GL1, and the symbol position HL1.

When the pilots corresponding to the signals of the second layer are designed, pilots are designed at the symbol position EL2, the symbol position FL2, the symbol position GL2, and the symbol position HL2, and null symbols are designed at the rest of the symbol positions of the third symbol position group.

When the pilots corresponding to the signals of the third layer are designed, pilots are designed at the symbol position EL3, the symbol position FL3, the symbol position GL3, and the symbol position HL3, and null symbols are designed at the rest of the symbol positions of the third symbol position group.

When the pilots corresponding to the signals of the fourth layer are designed, pilots are designed at the symbol position EL4, the symbol position FL4, the symbol position GL4, and the symbol position HL4, and null symbols are designed at the rest of the symbol positions of the third symbol position group.

As described above, according to the second, third, or fourth exemplary embodiment, the pilots are designed in an uplink 4-layer mode without using the orthogonal design where pilots overlap each other. Therefore, it is possible to more accurately estimate channel values as compared to an existing pilot design method. Further, since pilots are designed in the uplink 4-layer mode so as to be orthogonal using null symbols, it is possible to estimate one channel value at one tile. Furthermore, it is possible to apply a plurality of channel values, which are estimated from a plurality of successive tiles, to a linear interpolation method. Therefore, it is possible to estimate the entire channel value.

Meanwhile, according to an uplink 4-layer PUSC mode, subchannels obtained by dividing an uplink channel are allocated to each of four layers. The subchannels include a plurality of subcarriers that may not be positioned in succession. In this case, the subcarriers can be allocated to the subchannels by tile.

Equation 1 is an equation for allocating a plurality of subcarriers to the subchannels when pilots are designed at a part of a plurality of symbol positions corresponding to four subcarriers as in the first and second exemplary embodiments.

$$\text{Tiles}(s,n)=N_{subchannels} \cdot n+(Pt[(s+n)\bmod N_{subchannels}]+ UL\_\text{PermBase})\bmod N_{subchannels} \quad \text{(Equation 1)}$$

In Equation 1, Tile(s,n) indicates a plurality of tiles and a physical tile index in fast Fourier transform FFT. Here, the tile index begins from 0. n indicates a tile index in a subchannel. Pt indicates tile permutation. s indicates an index of a subchannel. UL_PermBase indicates a value of an integer in the range of 0 to 69. $N_{subchannels}$ indicates a numeral of a subchannel with respect to the size of FFT.

Meanwhile, according to the third or fourth exemplary embodiments of the present invention, the pilots are designed at a part of the plurality of symbol positions corresponding to eight subcarriers. Therefore, it is not appropriate for a plurality of subcarriers to be applied to the subchannels by Equation 1.

The following Equation 2 is an equation for allocating a plurality of subcarriers to the subchannels when pilots are designed at a part of a plurality of symbol positions corresponding to eight subcarriers.

$$\text{Tiles}(s,2n)=N_{subchannels} \cdot 2n+(2\cdot\{(Pt[(s+n)\bmod N_{subchannels}])+UL\_\text{PermBase}\})\bmod 2\cdot N_{subchannels}$$
$$\text{Tiles}(s,2n+1)=\text{Tiles}(s,2n)+1 \quad \text{(Equation 2)}$$

Next, block error rates (BLER) of the first, second, third, and fourth exemplary embodiments of the present invention are compared to one another.

Figure 7:
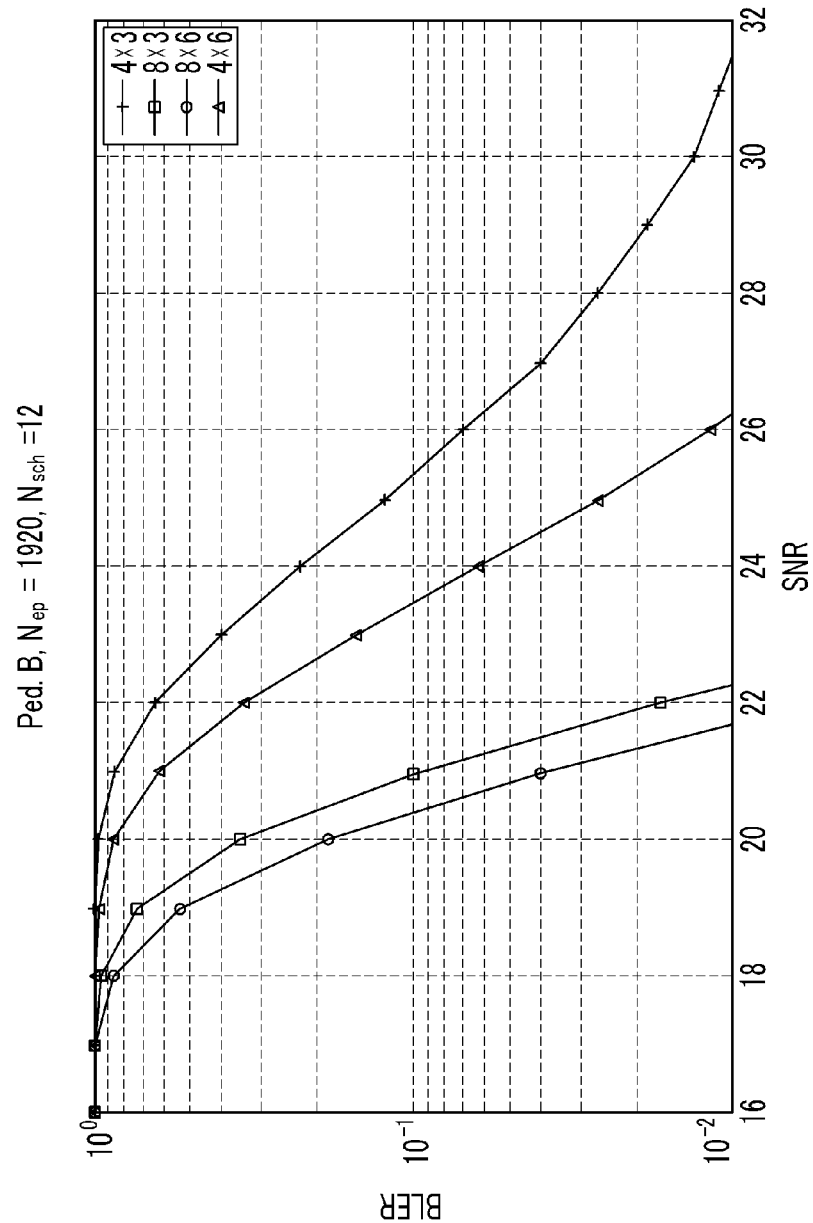
FIG. 7 is a graph that compares performances of the pilot designs according to the exemplary embodiments of the present invention in ITU-R channel Ped-B (3 km/h).
Figure 8:
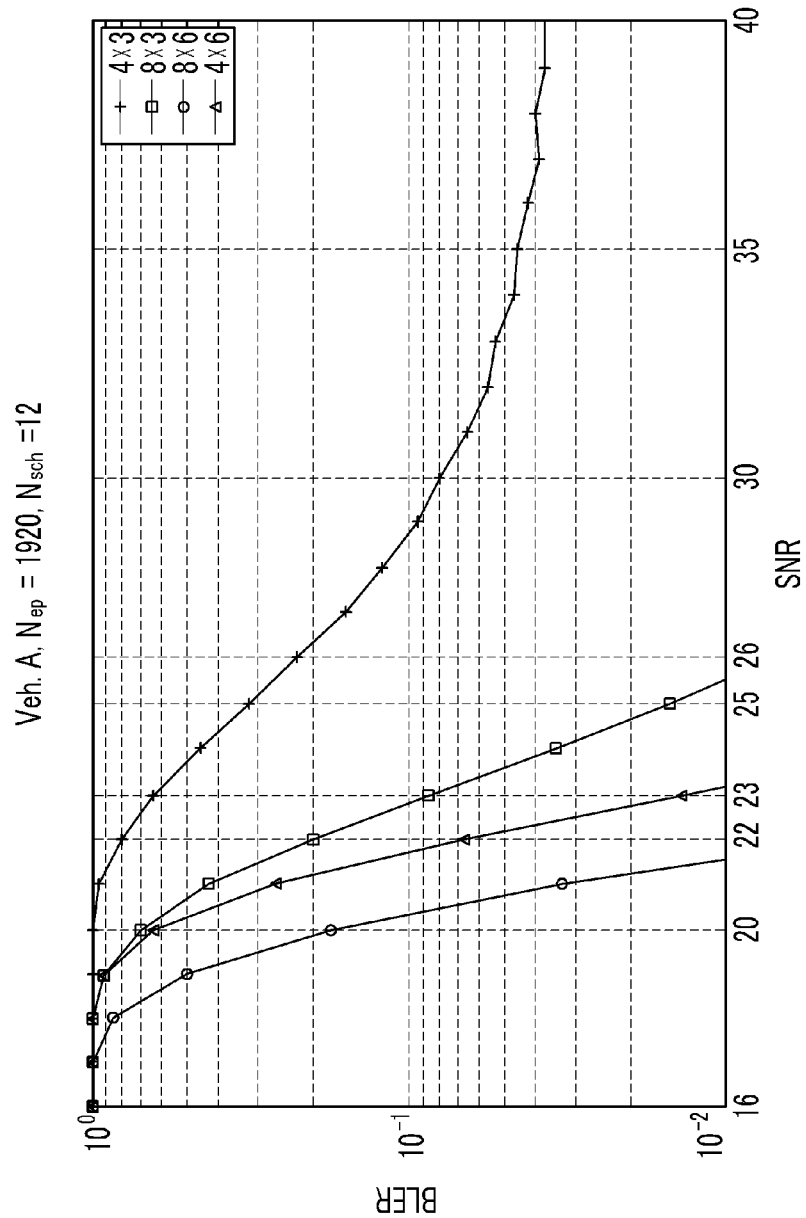
FIG. 8 is a graph that compares performances of the pilot designs according to the exemplary embodiments of the present invention in ITU-R channel Ped-B (60 km/h).

FIG. 7 is a graph that compares performances of the pilot designs according to the exemplary embodiments of the present invention in international telecommunication union radio communications (ITU-R) channel Ped-B (3 km/h), and FIG. 8 is a graph that compares performance of the pilot designs according to the exemplary embodiments of the present invention in ITU-R channel Veh-A (60 km/h).

In FIGS. 7 and 8, a horizontal axis represents a signal-to-noise ratio (SNR), and a vertical axis represents a block error rate (BLER). Further, represents the pilot design method using the 4×3 structure according to the first exemplary embodiment, and represents the pilot design method using the 4×6 structure according to the second exemplary embodiment. Furthermore, represents the pilot design method using the 8×3 structure according to the third exemplary embodiment, and represents the pilot design method using the 8×6 structure according to the fourth exemplary embodiment.

FIG. 7 shows that Nep (encoding packet size) is 1920 in Ped-B (3 km/h) that is one of ITU-R channel models and uplink performance of a condition where Nsch (the number of allocated slots) is 12 varies depending on the pilot design.

As shown in FIG. 7, smaller SNRs are shown at an arbitrary block error rate in an order of the first, second, third, and fourth exemplary embodiments. That is, it can be seen that the pilot design method according to the second, third, or fourth exemplary embodiments has improved performance as compared to the pilot design method according to the first exemplary embodiment. In particular, the pilot design method according to the third or fourth exemplary embodiment has better performance than the pilot design method according to the second exemplary embodiment.

Further, FIG. 8 shows that Nep is 1920 in Veh-A (60 km/h) that is one of ITU-R channel models and uplink performance of a condition where Nsch is 12 varies depending on the pilot design.

As shown in FIG. 8, smaller SNRs are required at an arbitrary block error rate in an order of the first, third, second, and fourth exemplary embodiments. That is, it can be seen that the pilot design method according to the second, third, or fourth exemplary embodiments has improved performance as compared to the pilot design method according to the first exemplary embodiment.

As described above, according to the second, third, and fourth exemplary embodiments of the present invention, pilots are designed on a plurality of successive tiles in an uplink 4-layer PUSC mode so as to be orthogonal using null symbols. Therefore, it is possible to more accurately estimate channels as compared to an existing pilot design method.

The above-mentioned exemplary embodiments of the present invention are not embodied only by a method and apparatus. Alternatively, the above-mentioned exemplary embodiments may be embodied by a program performing functions that correspond to the configuration of the exemplary embodiments of the present invention or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A pilot design method that designs pilots corresponding to a plurality of layers to an uplink frame including a plurality of successive tiles, the pilot design method comprising:
   receiving pilot position information from a base station;
   designing a first pilot in a first symbol position among a first plurality of symbol positions adjacent to a first corner of the plurality of successive tiles according to the pilot position information, the first pilot disposed in a first layer; and
   designing a second pilot in a second symbol position among a second plurality of symbol positions adjacent to a second corner of the plurality of successive tiles according to the pilot position information, the second pilot disposed in a first layer,
   wherein a third plurality of symbol positions and a fourth plurality of symbol positions adjacent to third and fourth corners, respectively, of the first layer each comprise a null symbol.

2. The pilot design method of claim 1, wherein the designing of the first pilot includes designing null symbols at the rest of the first plurality of symbol positions, and
   the designing of the second pilot includes designing null symbols at the rest of the second plurality of symbol positions.

3. The pilot design method of claim 1, wherein each of the tiles is divided into a plurality of subcarriers along a frequency axis and a plurality of symbol sections along a time axis.

4. The pilot design method of claim 2, wherein the plurality of tiles are positioned in succession along a time axis.

5. The pilot design method of claim 2, wherein the plurality of tiles are positioned in succession along a frequency axis.

6. The pilot design method of claim 2, wherein the plurality of tiles include a first tile, a second tile, a third tile, and a fourth tile,
   wherein the first and second tiles are positioned in succession along the time axis and the third and fourth tiles are positioned in succession along a time axis, and
   wherein the first and third tiles are positioned in succession along the frequency axis and the second and fourth tiles are positioned in succession along the frequency axis.

7. The pilot design method of claim 6, further comprising:
   designing a third pilot corresponding to a second layer at a third symbol position adjacent to the first corner according to the pilot position information; and
   designing a fourth pilot corresponding to the second layer at a fourth symbol position adjacent to the second corner according to the pilot position information.

8. A transmission apparatus, comprising:
   a subchannel allocation unit configured to store an uplink frame on a non-transitory computer-readable medium, the uplink frame comprising:
   a plurality of successive tiles including a first pilot that is designed at a first symbol position among a first plurality of symbol positions adjacent to a first corner of a plurality of successive tiles according to pilot position information of a base station, and a second pilot that is designed at a second symbol position among a second plurality of symbol positions adjacent to a second corner of the plurality of successive tiles according to the pilot position information of the base station,
   wherein a third plurality of symbol positions and a fourth plurality of symbol positions adjacent to third and fourth corners, respectively, of the first layer each comprise a null symbol.

9. The transmission apparatus of claim 8, wherein null symbols are designed at the rest of the first, second, third, and fourth plurality of symbol positions in the first layer.

10. A transmission apparatus, comprising:
    a subchannel allocation unit configured to store an uplink frame on a non-transitory computer-readable medium, the uplink frame comprising:
    a plurality of successive tiles,
    wherein pilots of first and second layers are designed at a first plurality of symbol positions adjacent to a first corner of the plurality of successive tiles,
    wherein the pilots of the first and second layers are designed at a second plurality of symbol positions adjacent to a second corner of the plurality of successive tiles,
    wherein a third plurality of symbol positions and a fourth plurality of symbol positions adjacent to third and fourth corners, respectively, of the first and second layers each comprise a null symbol.

11. The transmission apparatus of claim 10, wherein pilots of third and fourth layers are designed at a plurality of symbol positions among the third plurality of symbol positions adjacent to a third corner of the plurality of successive tiles,
    wherein the pilots of the third and fourth layers are designed at a plurality of symbol positions among the fourth plurality of symbol positions adjacent to a fourth corner of the plurality of successive tiles.

12. The transmission apparatus of claim 11, wherein the plurality of tiles are positioned in succession along a time axis.

13. The transmission apparatus of claim 11, wherein the plurality of tiles are positioned in succession along a frequency axis.

14. The transmission apparatus of claim 11, wherein the plurality of tiles include a first tile, a second tile, a third tile, and a fourth tile,
    wherein the first and second tiles are positioned in succession along the time axis and the third and fourth tiles are positioned in succession along a time axis,
    wherein the first and third tiles are positioned in succession along the frequency axis and the second and fourth tiles are positioned in succession along a frequency axis,
    wherein pilots of the third and fourth layers are designed at a plurality of symbol positions among the first plurality of symbol positions adjacent to the first corner, and
    wherein pilots of the third and fourth layers are designed at a plurality of symbol positions among the second plurality of symbol positions adjacent to the second corner.

15. The transmission apparatus of claim 14, wherein pilots of the first and second layers are designed at a plurality of symbol positions among the third plurality of symbol positions adjacent to the third corner, and
    wherein pilots of the first and second layers are designed at a plurality of symbol positions among the fourth plurality of symbol positions adjacent to the fourth corner.

16. A transmission apparatus that is configured to transmit an uplink frame including a plurality of successive tiles, the transmission apparatus comprising:
- a subchannel allocation unit configured to design a first pilot in a first symbol position among a first plurality of symbol positions adjacent to a first corner of the plurality of successive tiles the first pilot disposed in a first layer of a plurality of layers, design a second pilot in a second symbol position among a second plurality of symbol positions adjacent to a second corner of the plurality of successive tiles, the second pilot disposed in the first layer and designs null symbols at the rest of the first plurality of symbol positions and second plurality of symbol positions in the first layer;
- an inverse fast Fourier transformation unit that is configured to transform the plurality of successive tiles into a plurality of symbols of a time domain;
- a cyclic prefix insertion unit that is configured to insert cyclic prefixes between the plurality of symbols; and
- a transmission unit that is configured to transmit an uplink frame including the cyclic prefixes and the plurality of symbols.

17. The transmission apparatus of claim 16, wherein the plurality of tiles are positioned in succession along a time axis.

18. The transmission apparatus of claim 16, wherein the plurality of tiles are positioned in succession along a frequency axis.

19. The transmission apparatus of claim 17, wherein a 4×3 set of symbol positions forms a tile.

20. The transmission apparatus of claim 17, wherein the plurality of tiles forms a 4×6 structure.

* * * * *